//www.example.com
United States Patent [19]

Aronson et al.

[11] 4,086,532
[45] Apr. 25, 1978

[54] SPEED RESPONSIVE AND INDICATING SYSTEM

[75] Inventors: Howard A. Aronson, Lincolnwood; San Chi Chung, Lombard, both of Ill.

[73] Assignee: Stewart-Warner Corporation, Chicago, Ill.

[21] Appl. No.: 657,040

[22] Filed: Feb. 11, 1976

[51] Int. Cl.² .............................................. G01P 3/48
[52] U.S. Cl. .................................. 324/166; 324/161
[58] Field of Search ............. 324/166, 168, 172, 161, 324/173; 235/92 FQ; 339/151, 157

[56] References Cited

U.S. PATENT DOCUMENTS

| | | | |
|---|---|---|---|
| 3,525,044 | 8/1970 | Richmond | 324/173 |
| 3,639,753 | 2/1972 | Reich | 324/166 X |
| 3,754,121 | 8/1973 | Delay et al. | 324/166 X |
| 3,792,460 | 2/1974 | Ratz | 324/161 X |
| 3,835,382 | 9/1974 | Weisbart | 324/161 |

Primary Examiner—Rudolph V. Rolinec
Assistant Examiner—Vincent J. Sunderdick
Attorney, Agent, or Firm—Merriam, Marshall & Bicknell

[57] ABSTRACT

This disclosure relates to a system for sensing the speeds of one or more movable members and selectively displaying one of the speeds. The system includes a speed sensor associated with each moving member and providing an output that is a function of the speed. A mode selector circuit directs one of the outputs to a multiplier circuit that converts the output to a form which is displayed or indicated in the desired system of units. The mode selector circuit sets up the system for one mode of operation upon initial energization but may be changed to a different mode by a sealed contactless switch. The multiplier circuit is programmable using an externally adjustable code device. The display automatically adjusts for different requirements in each of the modes and for different external operating conditions.

21 Claims, 12 Drawing Figures

SPEED RESPONSIVE AND INDICATING SYSTEM

DISCLOSURE

A variety of system designs have been provided in the past for sensing and displaying the speed of a moving member. Such prior art designs have had limited capabilities however. For example, a design may be capable of responding to and indicating the speed of only one member, or it may be designed for a specific application and not be accurate in a slightly different application.

It is therefore a principle object of the present invention to provide an improved system which overcomes the disadvantages of the prior art systems.

A system in accordance with the present invention is designed for measuring and indicating the speed of at least one moving member, and comprises sensor means adapted to respond to the speed of a member for generating a signal having a characteristic which is a function of said speed, multiplier means connected to receive said signal and multiplying said characteristic by a preselected ratio, indicator means responsive to said characteristic for indicating said speed, and said multiplier means including ratio selector means for coding said multiplier means to multiply said characteristic by a preselected ratio and thereby indicate said measurement in a desired system of units.

The system may sense the speed of a plurality of moving members and be adjustable to different modes of operation, a single indicator of the system displaying the speed of a different member in each mode.

A code selector device is included in the multiplier means for coding or preselecting the ratio, the device being externally adjustable to enable use of the system with a variety of different members.

The foregoing and other features of the invention may be better understood from the following detailed description taken in conjunction with the accompanying figures of the drawings, wherein.

While the specific example of the present invention described herein is adapted for use as a speedometer and tachometer for a tractor, it should be realized that the invention has uses in other fields, and that the invention is not limited to use in any specific field.

Figures 1, 2, 3:
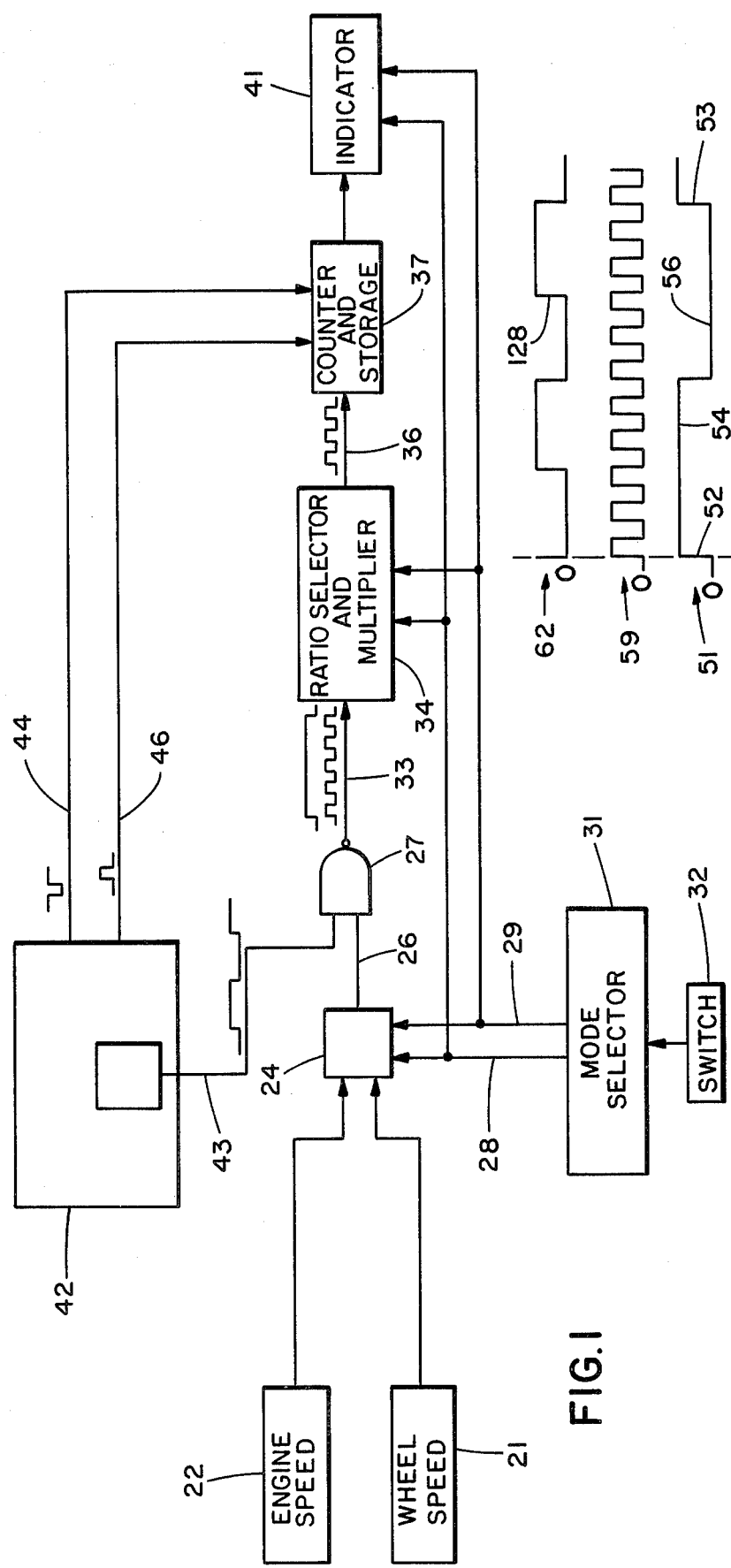
FIG. 1 is a block diagram of a system embodying the present invention.
FIG. 2 is a timing diagram illustrating the operation of the system.
FIG. 3 is a table which illustrates the operation of the system.
Figure 4:
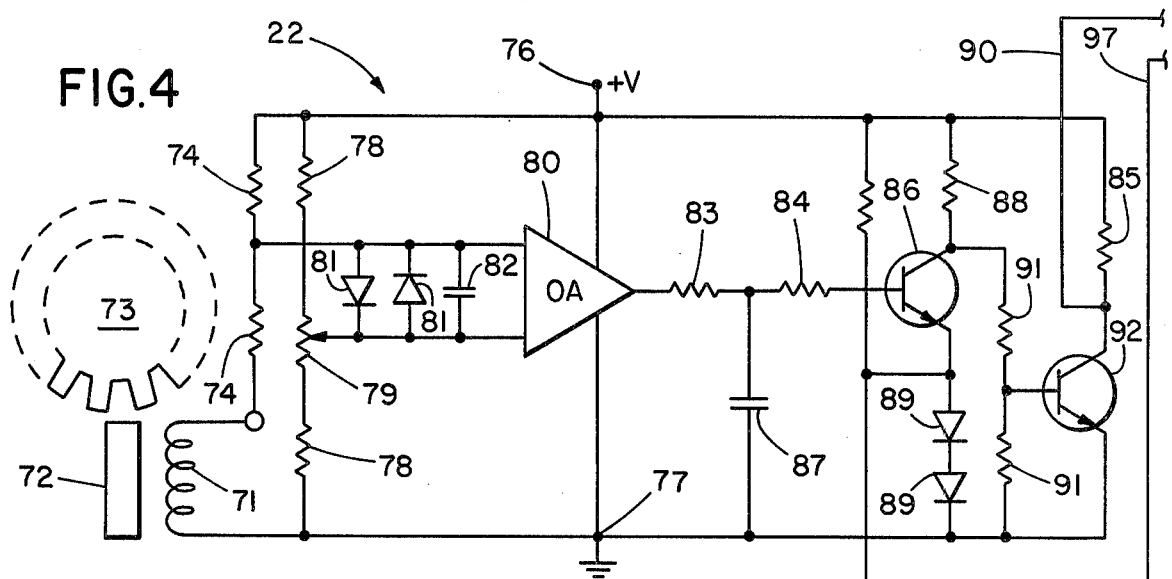
FIGS. 4–10 are schematic diagrams of the system.

With reference to FIG. 1, the illustrated specific example of the system is designed to respond to engine speed and to wheel revolutions of the tractor and to selectively measure and display wheel speed (in mph), engine speed (in rpm), and the speeds of two separate power take-offs (in rpm). The system includes a wheel speed sensor 21 which generates a signal having a frequency that is a function of the wheel speed of the tractor, and an engine speed sensor 22 which generates a signal having a frequency that is a function of the engine speed. The two variable frequency sensor signals are fed to a component 24 which passes one of the two sensor signals to a line 26 that leads to a NAND gate 27. The component 24 is programmed by binary "address" signals appearing on two address lines 28 and 29 to selectively pass one of the two sensor signals, the address signals on the two lines 28 and 29 being generated by a mode selector and indicator component 31. The component 31 has a mode selector switch 32 which is manually adjustable by an operator of the tractor to generate one of four different addresses on the lines 28 and 29. When one of the four addresses is generated by the component 31, the component 24 passes the wheel speed signal and when any of the other three addresses is generated the component 24 passes the engine speed signal.

The output of the gate 27 is fed on a line 33 to an input of a programmable ratio selector and multiplier 34 which also receives the address signals appearing on the lines 28 and 29. Depending upon the particular address on the lines 28 and 29, the multiplier 34 multiplies the frequency of the signal on the line 33 by a preselected ratio or factor, and the multiplied frequency signal is fed on an output line 36 to an input of a counter and storage component 37. The component 37 counts the number of pulses on the line 36 during a time base, stores the count, and feeds the count to an indicator 41 which in the present instance has a light emitting diode (LED) type of display.

The system shown in FIG. 1 further includes a timing generator 42 which generates timing signals for the system. A time base signal is generated on a line 43 which is connected to a control input of the gate 27, and during a part of each cycle of the system the gate 27 passes the signal on the line 26 to the line 33. The timing generator 42 further generates a strobe pulse on an output line 44 and a reset pulse on another output line 46. As will be described in connection with FIG. 2, the strobe pulse appears slightly ahead in time of the reset pulse on the line 46. The strobe and reset pulses on the lines 44 and 46 are connected to the counter and storage component 37, and the strobe pulse causes the count in the counter to be transferred or shifted to the storage components. Immediately after the count transfer takes place, the reset pulse on the line 46 resets the counters to zero in preparation for the next cycle. The indicator 41 displays the information in the storage components until the stored information is updated by the next strobe pulse.

With reference to FIGS. 1 and 2, the time base signal appearing on the line 43 is represented by the waveform 51 in FIG. 2. One cycle extends from the rising edge 52 to the rising edge 53, and the length of time for one cycle may be, for example, approximately 1 second. The time base 51 is divided into two parts of equal time length, a counting part 54 and a strobe and reset part 56. The part 54 has a logic 1 or high value whereas the strobe and reset part 56 has a logic 0 or low value. During the existence of the high counting part 54, the gate 27 passes the signal on the line 26 to the line 33. During the existence of the strobe and reset part 56, the gate 27 blocks the signals on the line 26, but during this latter portion of the signal a strobe pulse 57 appears on the line 44 and transfers the count from the counter to the storage elements in the component 37. Also during the strobe and reset part 56, the generator 42 generates a reset pulse 58 on the line 46 which resets the counter in the component 37. As shown in FIG. 2, there is a time lag between the pulses 57 and 58.

The wheel speed and engine speed signals out of the two sensors 21 and 22 are represented by the waveform 59, and the signal on the line 33 at the output of the gate 27 is represented by the waveform 61. As indicated by the waveform 61, the train of pulses of the waveform 59 appear on the line 33 only during the counting part 54 of the time base signal 51. Actually, the frequency of the signals 59 and 61 would be far higher than indicated in FIG. 2, in the specific example being described herein. FIG. 2 further illustrates a waveform 62 which appears in the timing generator 42 and is utilized in the generation of the strobe pulse 57 and of the reset pulse 58.

With reference to FIG. 3, the column headed "parameter" lists four different modes of operation of the system. The columns headed "28" and "29" indicate the four addresses, which are in binary form, appearing on the address lines 28 and 29 in the four modes. The numbers in the column headed "program" indicate the ratios or multipliers by which the frequencies are multiplied in the four modes, for the specific example described herein. This information will be discussed in greater detail in connection with FIGS. 4 to 10.

Considering briefly the operation of the system, the timing generator 42 cyclically generates the time base signal 51 and the pulses 57 and 58. The wheel speed sensor 21, assuming the tractor is moving, and the engine speed sensor 22 continuously generate trains of pulses, the frequencies representing the wheel speed and the engine speed respectively. The two sensor signals are fed to the component 24 which passes one of the two pulse trains to the line 26, depending upon the mode of operation selected by the operator using the mode selector switch 32. The output of the component 24 appears on the line 26 and during the counting part 54 of each time base signal 51, the train of pulses on the line 26 is passed to the line 33. During the strobe and reset part 56 of each time base signal 51, the train of pulses appearing on the line 26 is blocked. The number of the pulses appearing on the line 33 during the counting part 54 is multiplied in the multiplier 34 by a ratio or factor which is preset for each of the four modes of operation. The numbers in the column headed PROGRAM in FIG. 3 are the multiplication factors for the four modes in the specific example described herein. The multiplied signal appears on the line 36 and is fed to the counter in the component 37. At the end of the counting part 54, the train of pulses on the line 36 is terminated. When the strobe pulse 57 appears on the line 44, the count in the counter is transferred to storage or latch components which drive the indicator 41. Immediately after the count has been transferred to the storage elements, the reset pulse 58 on the line 46 resets the counter stages in the component 37. The display 41, however, continues to display the information in the latches until this information is updated by the strobe pulse 57 in the next succeeding cycle. The display 41 indicates whatever information is contained in the storage components. At the end of a cycle, the counters in the component 37 have been reset to 0 and as soon as the rising edge 53 appears at the beginning of the next succeeding cycle, the gate 27 is again opened and the pulse train on the line 26 is passed to the line 33 in a new cycle of operation.

The system, in addition to itself being novel and useful, includes a number of novel parts, such as coding devices in the multiplier 34 used to preselect the ratio by which the pulses on the line 33 are multiplied, the mode selector switch 32 which is hermetically sealed and has an exceptionally long life because it does not include mechanical contacts, an arrangement for automatically setting the system in one of the four modes of operation at initial energization of the system, and the indicator 41 which advantageously displays the stored information under different conditions.

The construction and operation of the system will be described in greater detail in connection with FIGS. 4-10. The system includes digital components, and ground potential represents logic zero or low and a positive potential represents logic one or high. The positive potential may be, for example, approximately 7.5 volts DC.

The engine speed sensor 22 (FIGS. 1 and 4) includes a pickup coil 71 wound on a magnetic core 72 which is positioned adjacent a toothed member 73. The member 73 is connected to be turned at a rate which is a direct ratio or multiple of the engine speed and it may be connected, for example, to the engine flywheel. The coil 71 is connected in series with two resistors 74 and across a positive potential terminal 76 and a ground terminal 77. Current flows through the series path of the resistors 74 and the coil 71, and as each tooth of the member 73 moves past the core 72 a voltage pulse is induced in the coil 71 which changes the amount of current flowing through the resistors 74. The juncture of the two resistors 74 is connected to one input of an operational amplifier 80 which functions as a voltage comparator. The other input of the amplifier 80 is connected to a voltage divider network including two fixed resistors 78 and a potentiometer 79, these three resistors also being connected between the two terminals 76 and 77. The wiper of the potentiometer 79 is connected to the second input of the amplifier 80, and the setting of the potentiometer 79 of course establishes the reference potential. The voltage induced in the coil 71 has a generally sinusoidal shape, and each time the voltage at the juncture of the two resistors 74 equals the reference potential on the wiper of the potentiometer 79, the operational amplifier 80 output switches, thus producing a signal at the output of the amplifier 80 which alternately switches between high and low.

Back-to-back diodes 81 and a capacitor 82 are connected across the two inputs of the amplifier 80 to protect the amplifier 80 against excessively high peak voltages.

The output of the amplifier 80 is connected through two series connected resistors 83 and 84 to the base of an NPN transistor 86, the juncture of the two resistors 83 and 84 being connected by a capacitor 87 to the ground terminal 77. The collector of the transistor 86 is connected by a resistor 88 to the positive potential terminal 76 and the emitter of the transistor 86 is connected by two series-connected diodes 89 to the ground terminal 77. The signal out of the operational amplifier 80 switches the transistor 86 on and off. The combination of the two resistors 83 and 84, the capacitor 87 and the two diodes 89 function as a filter for RF (radio frequency) noise and electrical transients.

The collector of the transistor 86 is also connected by two series-connected resistors 91 to the ground terminal 77, and the juncture of the two resistors 91 is connected to the base of another NPN transistor 92 which has its collector and emitter respectively connected to the positive potential terminal 76 through a pull-up resistor 85 and to the ground terminal 77. The transistor 92 inverts the output of the transistor 86, and the output of the transistor 92 is taken from its collector which is connected by a line 90 (FIGS. 4 and 7) to three inputs 94 of the component 24 (also shown in FIGS. 1 and 7).

The wheel speed sensor 21 is constructed and operates similarly to the sensor 22 and therefore will not be described in detail. The sensor 21 also includes a sensing coil and a core positioned adjacent a toothed member 96 which rotates at a speed that has a direct and constant relation to the speed of an axle of the tractor. The member 96 may, for example, be a toothed member that is fastened to one of the tractor axles or it may comprise a gear in the drive train which turns at a fixed ratio of the tractor axles.

The two sensors 21 and 22 may otherwise be identical with the exception that the resistors in the sensor 21 corresponding to the resistors 74, 78 and 79 may have higher values than those of the sensor 22 in order to produce a lower current level in the pickup coil of the sensor 21. The purpose of the difference is to compensate for the relatively slow speed of the toothed member 96 relative to the member 73. The emitter of the sensor 21 transistor corresponding to the transistor 86 is connected to the emitter of the transistor 86 so that the two diodes 89 may serve both sensor circuits 21 and 22.

The output of the sensor 21 appears on a line 97 which leads from the collector of a transistor corresponding to the transistor 92 of the sensor 22. However, instead of connecting the line 97 directly to the component 24, the line 97 is connected to the input of the frequency doubler circuit 95 (FIG. 7) which may have any conventional construction. The purpose of the doubler 95 is to raise the value of the relatively low frequency out of the sensor 21 closer to the frequency out of the sensor 22. The output of the frequency doubler 95 is connected to another input 99 of the component 24.

The output signal of the component 24 appears on a line 101, and it consists of either the signal on the three inputs 94 or the signal on the input 99, depending upon the "address" appearing on two control inputs 102 and 103 of the component 24. The control input 102 is connected to the line 28 and the control input 103 is connected to the line 29. The two columns headed 28 and 29 show the four different addresses may be selectively generated and applied to the two lines 28 and 29. When the address for ground speed appears on the lines 28 and 29, the signal on the input 99, which originates from the ground speed sensor 21, is passed to the output line 101. When any one of the other three addresses appears on the lines 28 and 29, the engine speed signal appearing on the other three inputs 94 is passed to the output 101.

Figure 5:
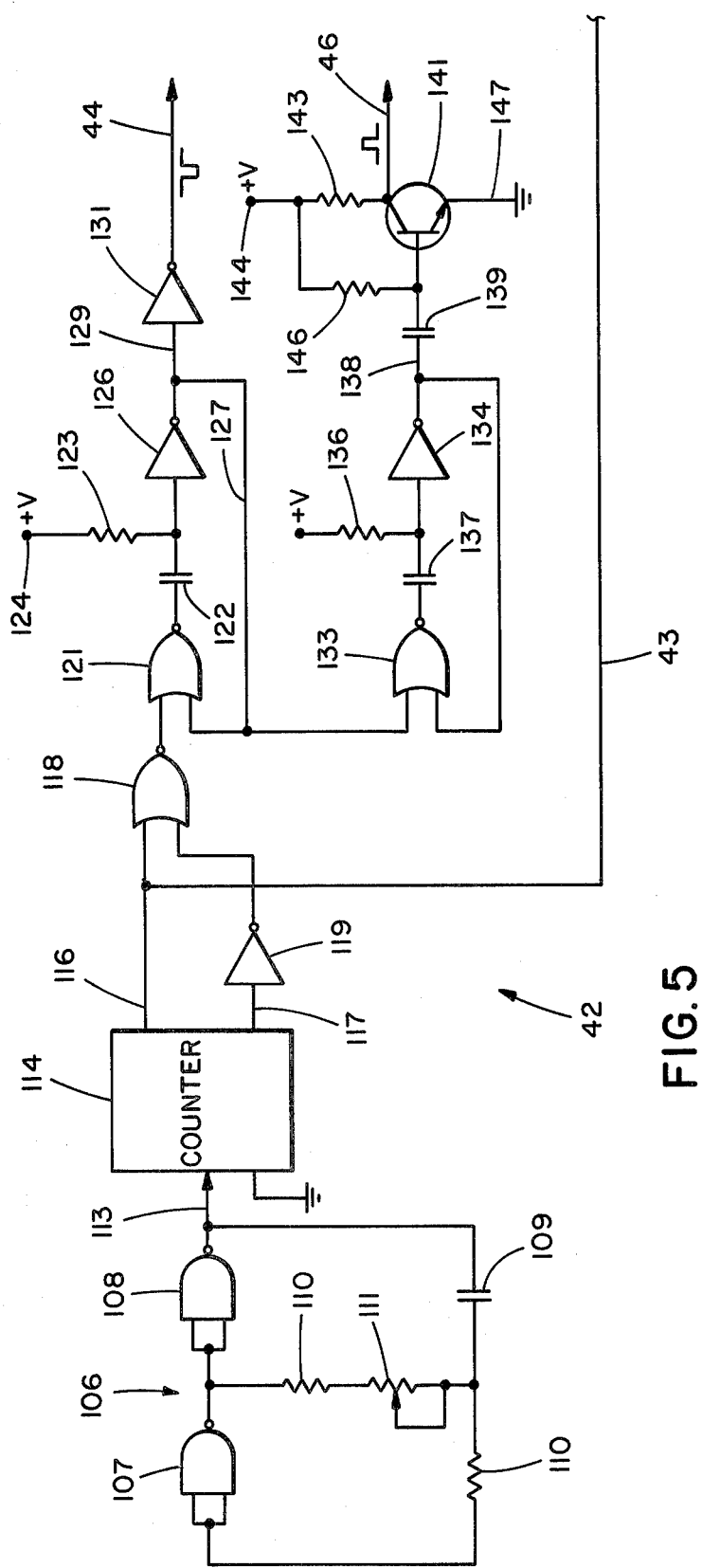
Figure 6:
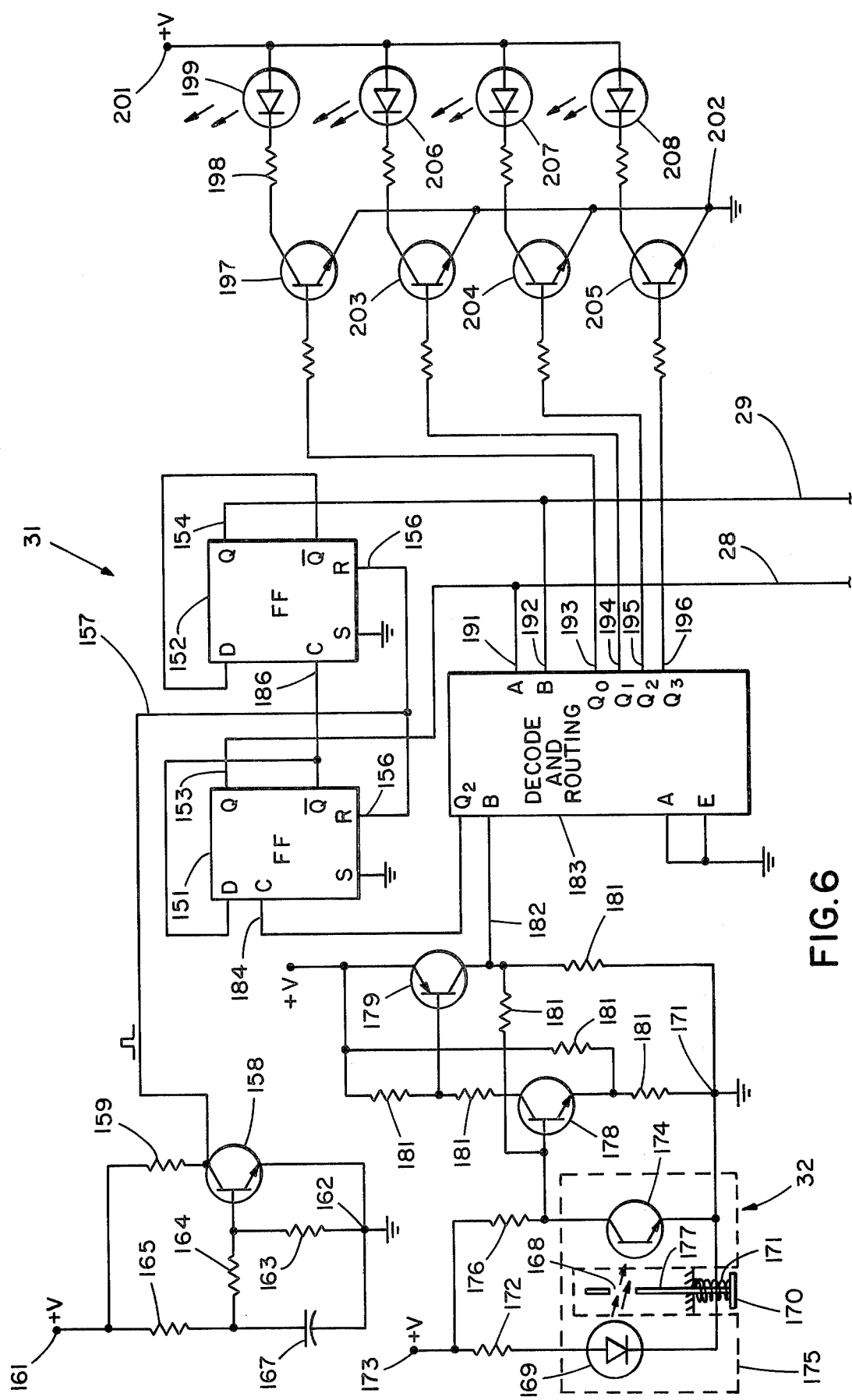

The output line 101 is connected to one input of the NAND gate 27 which has its other input connected by the line 43 to an output line of the timing generator 42 (FIGS. 1 and 5).

Considering next the construction and operation of the timing generator 42, it includes an RC oscillator 106 (FIG. 5) formed by two NAND gates 107 and 108, a capacitor 109, fixed resistors 110 and a variable resistor 111. The variable resistor 111 permits an adjustment of the frequency of the oscillator 106. The output of the oscillator 106 appears on a line 113 which is connected to the input of a multistage binary counter 114. The time base signal 51 appears on an output line 116 which is connected to the last stage of the counter. The waveform 62 appears on another output line 117 which is connected to the second from the last stage of the counter. The number of stages of the counter is of course determined both by the frequency of the oscillator 106 and by the desired time duration of the time base signal 51, and in the present instance a 14-stage binary counter is provided.

The line 43 which leads to an input of the gate 27 is connected directly to the output 116 of the counter 114. The output 116 is also connected to one input of a NOR gate 118, and the output line 117 is connected through an inverter 119 to a second input of the NOR gate 118. The output of the NOR gate 118 is connected to trigger a one-shot or monostable multivibrator formed by a NOR gate 121, a capacitor 122, a resistor 123 connected to a positive potential terminal 124, an inverter 126, and a feedback line 127 which connects the output of the inverter 126 with an input of the NOR gate 121. With reference to FIG. 2, during the strobe and reset part 56 of the time base signal 51, the line 116 is low. When the line 117 becomes high at the time indicated by the numeral 128 in FIG. 2, the output of the inverter 119 becomes low and the output of the NOR gate 118 rises. This rising voltage triggers the one-shot multivibrator and causes it to generate a positive pulse on the output 129 of the multivibrator, and this pulse is inverted by an inverter 131 which has its output connected to the line 44. As shown in FIG. 2, the strobe pulse 57 is a negative going pulse.

The pulse appearing at the output 129 of the one-shot multivibrator which forms a strobe pulse also triggers a second one-shot multivibrator formed by a NOR gate 133, an inverter 134, a resistor 136 and a capacitor 137. The output of this multivibrator, which is constructed and operates similarly to the previously mentioned one-shot multivibrator, appears on an output line 138 which is connected by a capacitor 139 to the base of an NPN transistor 141. The collector of the transistor 141 is connected by a resistor 143 to a positive potential terminal 144. The base of the transistor 141 is connected by a resistor 146 to the terminal 144, and the emitter of the transistor 141 is connected to a ground terminal 147. The output line 46 is connected to the collector of the transistor 141 and consists of the positive going reset pulse 58 (FIG. 2). As previously mentioned, the reset pulse 58 is delayed slightly behind the time of the strobe pulse 57, this time delay being due to the capacitance of the reset pulse generating components. The two lines 44 and 46 are connected to inputs of the counter and storage component 37 illustrated in FIGS. 1 and 8.

With reference next to the mode selector and indicator circuit 31 (FIGS. 1 and 6), the addresses appearing on the two lines 28 and 29 are formed by two flip-flop circuits 151 and 152 which are connected in the form of a two-stage binary counter. The Q outputs 153 and 154 of the flip-flops 151 and 152 are respectively connected to the lines 28 and 29. In the first address, both Q outputs are at logic 0 or low values as shown in FIG. 3; in the second address, the Q output of the flip-flop 151 is at logic 1 or a high value whereas the Q output of the flip-flop 152 is low; in the third address the Q output of the flip-flop is low whereas the Q output of the flip-flop 152 is high; and in the fourth address both Q outputs are high.

The reset inputs 156 of both flip-flops 151 and 152 are connected by a line 157 to a circuit which generates a pulse when the power is initially applied to the system. In the specific example described herein where the system is used with a tractor, when the tractor ignition is turned on power is applied to the system resulting in generation of a positive or high pulse on the line 157 and resetting of the two flip-flops 151 and 152 which of course results in their Q outputs 153 and 154 both going to their low values, which is the first address previously described. The pulse generator comprises an NPN transistor 158 which has its collector connected by a resistor 159 to a positive potential terminal 161 and its emitter connected to a ground terminal 162. The base of the transistor 158 is connected by a resistor 163 to the ground terminal 162 and by resistors 164 and 165 to the positive potential terminal 161. A capacitor 167 is connected between the juncture of the two resistors 164 and 165 and the ground terminal 162. When the ignition is turned on and a positive potential initially appears at the terminal 161, the transistor 158 and the associated resistors and capacitors generate a pulse on the line 157 which resets the two flip-flops 151 and 152 as previously described. After the termination of the pulse the line 157 remains at the low value.

A manually operable switch 32 is also provided for actuating the circuit 31 to generate one of the other three addresses on the lines 28 and 29. The manually operable switch 32 is hermetically sealed and has an infinite life since it does not include mechanical contacts. While the present construction includes an optical switch for this purpose, it should be understood that another type of contactless switch could be used. For example, a magnetic switch including a Hall probe in a magnetic field may be used. The optical switch 32 includes a light emitting diode 169 which has its cathode connected to a ground terminal 171 and its anode connected by a resistor 172 to a positive potential terminal 173. The diode 169 continuously generates light and it is positioned adjacent a photoresponsive transistor 174 which has its emitter connected to the ground terminal 171 and its collector connected through a resistor 176 to the positive terminal 173. The transistor 174 is normally biased to saturation due to the light received from the diode 169. In order to change from one address to another, the operator presses a shutter mechanism 177 illustrated schematically in FIG. 6 which momentarily blocks the path of light between the diode 169 and the transistor 174. The transistor 174 consequently goes from its saturated condition to its biased off condition, causing a positive pulse to appear on its collector. This positive pulse on the collector of the transistor 174 activates a Schmitt trigger circuit formed by two transistors 178 and 179 and by resistors 181. The positive pulse output of the Schmitt trigger appears on an output line 182 which is connected through a decoding and routing component 183 to the toggle input 184 of the flip-flop 151. The signals on the line 182 are routed directly through the component 183 to the toggle input 184.

The shutter 177 has an opening 168 formed therein which passes light from the diode 169 to the transistor 174. The shutter 177 further includes a button part 170 and a compression spring 171 between the button part 170 and a fixed frame, and the spring normally holds the shutter in the position shown in FIG. 6 where the diode light passes through the opening 168. By pressing the button 170 the operator moves the shutter 177 upwardly so that the light is blocked, but the spring 171 returns the shutter 177 when the operator releases the pressure. The switch 32 further includes a transparent hermetically sealed outer casing 175 which protects the switch components against moisture and dirt. The shutter 197 is mounted outside the casing 175 and light from the diode 169 passes through the transparent casing and through the opening 168. The button 170 is located adjacent the casing 175 so that the operator can press the button.

Assuming that the two flip-flops 151 and 152 have initially been reset by a pulse on the line 157, the appearance of the first pulse on the lines 182 and 184, due to the operator having pressed the shutter mechanism 177, causes the flip-flop 151 to be set and its Q output 153 to become high. The Q output 154 of the other flip-flop 152 is still low, however, and therefore the second address appears, wherein the line 28 is high and the line 29 is low. The appearance of a second pulse on the lines 182 and 184, due to the operator pressing the button 170 a second time, results in the flip-flop 151 being toggled and returning to the reset condition. The $\overline{Q}$ output of the flip-flop 151 is connected to the toggle input 186 of the flip-flop 152, and consequently when the flip-flop 151 resets, the flip-flop 152 is toggled and its Q output 154 becomes high. This of course is the third address. Receipt of still another pulse on the lines 182 and 184 causes the flip-flop 151 to be set and the fourth address is generated on the lines 28 and 29 because the Q outputs 153 and 154 are both high. If the operator presses the button 170 once again, the pulse on the lines 182 and 184 will reset both of the flip-flops 151 and 152, causing the first described address to once again appear on the lines 28 and 29.

In addition to being connected to the lines 28 and 29, the Q outputs 153 and 154 of the two flip-flops 151 and 152 are also connected to two inputs 191 and 192 of the component 183. The component 183 also has four signal output connections 193, 194, 195 and 196. When the first address appears on the lines 28 and 29, the output line 193 becomes high whereas the other three output lines 194–196 are low. The output line 193 is connected to the base of an NPN transistor 197 which has its collector connected through a resistor 198 and a light emitting diode 199 to a positive potential terminal 201. The emitter of the transistor 197 is connected to a ground terminal 202. The positive pulse on the output line 193 biases the transistor 197 on which thereby forms a current path from the positive terminal 201, through the diode 199, the transistor 197 and to the ground terminal 202. The diode 199 may be mounted on a panel of a container for the system, and a nameplate or label would be provided adjacent the diode 199 which would state that the system is in the mode of operation for measuring and indicating the ground speed of the tractor.

When the flip-flops 151 and 152 have been triggered to generate one of the other three addresses, a high signal will appear on one of the lines 194 through 196 when the second, third and fourth addresses are respectively generated. Transistors 203 to 205 and light emitting diodes 206 to 208 are provided for each of the other three output lines 194 through 196, respectively. Depending upon whether the first, second, third or fourth address has been generated by the two flip-flops 151 and 152, one of the diodes 199 or 206 to 208 will be energized. Name plates or labels would also be mounted adjacent the diodes 206 to 208 to indicate the selected mode of operation of the system.

The programmable ratio selector and multiplier circuit 27 (FIGS. 1 and 7) is connected to receive the pulses at the output 214 of the NAND gate 27, and the circuit multiplies the pulses by a rate or ratio which is preselected in accordance with the address on the lines 28 and 29, generated by the mode selector circuit 31. The circuit 34 includes three identical pulse multiplier circuits 210, 211 and 212, each of which has its clock input 213 connected to the line 214 which leads from the output of the NAND gate 27. The out and $E_0$ terminals 216 and 217 of the two multipliers 210 and 211 are connected to the cascade and $E_{in}$ inputs 218 and 219 of the multipliers 211 and 212, respectively. The output 221 of the third multiplier 212 is connected to the input of a decade counter in the component 37, as will be described later in connection with FIG. 8.

The ratio or rate by which the incoming pulses on the line are multiplied is set by code signals in BCD form appearing at the inputs 222, 223, 224 and 225 of each multiplier, and the BCD code signals are different for each mode of operation, or address. High signals appearing on the inputs 222, 223, 224 and 225 represent the numbers 1, 2, 4 and 8, respectively. For example, if the inputs 222 of all three multipliers 210 through 212 are all high, the input 223 of the multiplier 211 is high, and the input 224 of the multiplier 212 is high, and all of the other inputs are low, the ratio or multiplier factor for the three components 210 through 212 is 135. Therefore, for every 1,000 pulses appearing on the line 214, a total of 135 pulses will appear on the output line 221. It will be apparent that any desired three digit ratio or multiplier factor may be coded into the three multipliers 210 through 212 by selectively grounding or making high the four inputs 222 through 225 of each of the three multipliers.

The three multipliers 210, 211 and 212 receive coded signals from six identical BCD code programmers 231 through 236. The two programmers 231 and 232 are connected to supply code signals to the multiplier 210, the two programmers 233 and 234 are connected to supply code signals to the multiplier 211 and the two programmers 235 and 236 are connected to supply code signals to the multiplier 212. Each of the three code programmers 231, 233 and 235 has two output connections 237 and 238 which are connected to the inputs 222 and 223 of the associated multipliers, and each of the three programmers 232, 234 and 236 has two outputs 239 and 240 which are connected to the inputs 224 and 225 of the associated multipliers.

Each of the six BCD code programmers also has two address inputs 242 and 243. The address input 242 of each programmer is connected to the line 28 leading from the mode selector circuit 31, and each of the address inputs 243 is connected to the other address line 29 leading from the mode selector circuit 31. Each of the programmers 231 through 236 further has two strobe input connections 244 and 245, all of which are connected to ground so that the six programmers will always be enabled.

Each of the six BCD code programmers 231 through 236 further includes two sets of information inputs. With regard to the programmers 231, 233 and 235 the X set of four information inputs is indicated by the reference numerals 251 through 254 and this X set of inputs is associated with the output 237. The Y set of four information inputs 256 to 259 is associated with the output 238. Each of the programmers 232, 234 and 236 includes a set of four X inputs 261 to 264 associated with the output 239, and a set of four Y inputs 266 to 269 associated with the output 240.

When the first previously described address appears on the two address inputs 242 and 243 of the programmers 231, 233 and 235, the information in binary form, either high or low signals, on the two inputs 251 and 256 will respectively appear at the two output connections 237 and 238. When the second address appears on the inputs 242 and 243, the information at the inputs 252 and 257 will appear at the outputs 237 and 238, respectively. Similarly, when the third address appears at the inputs 242 and 243, the information at the inputs 253 and 258 will appear at the outputs 237 and 238, and when the fourth address appears on the inputs 242 and 243, the information on the inputs 254 and 259 will appear on the outpus 237 and 238.

Regarding the programmers 232, 234 and 236, the first address on the inputs 242 and 243 causes the information on the inputs 261 and 266 to appear at the outputs 239 and 240, the second address causes the information at the inputs 262 and 267 to appear at the outputs, the third address causes the information on the inputs 263 and 268 to appear at the outputs, and the fourth address causes the information at the inputs 264 and 269 to appear at the outputs.

With reference to FIG. 3, in the specific example being described and illustrated herein, in the first mode the six code programmers 231 and 236 are wired to program the multiplier 210 for the number nine in BCD form, the multiplier 211 for the number 4, the multiplier 212 for the number 3. FIG. 3 also gives the other three ratios or rates which are fed in BCD form to the three multipliers 210 through 212 for the other three addresses or modes of operation.

Figure 7:
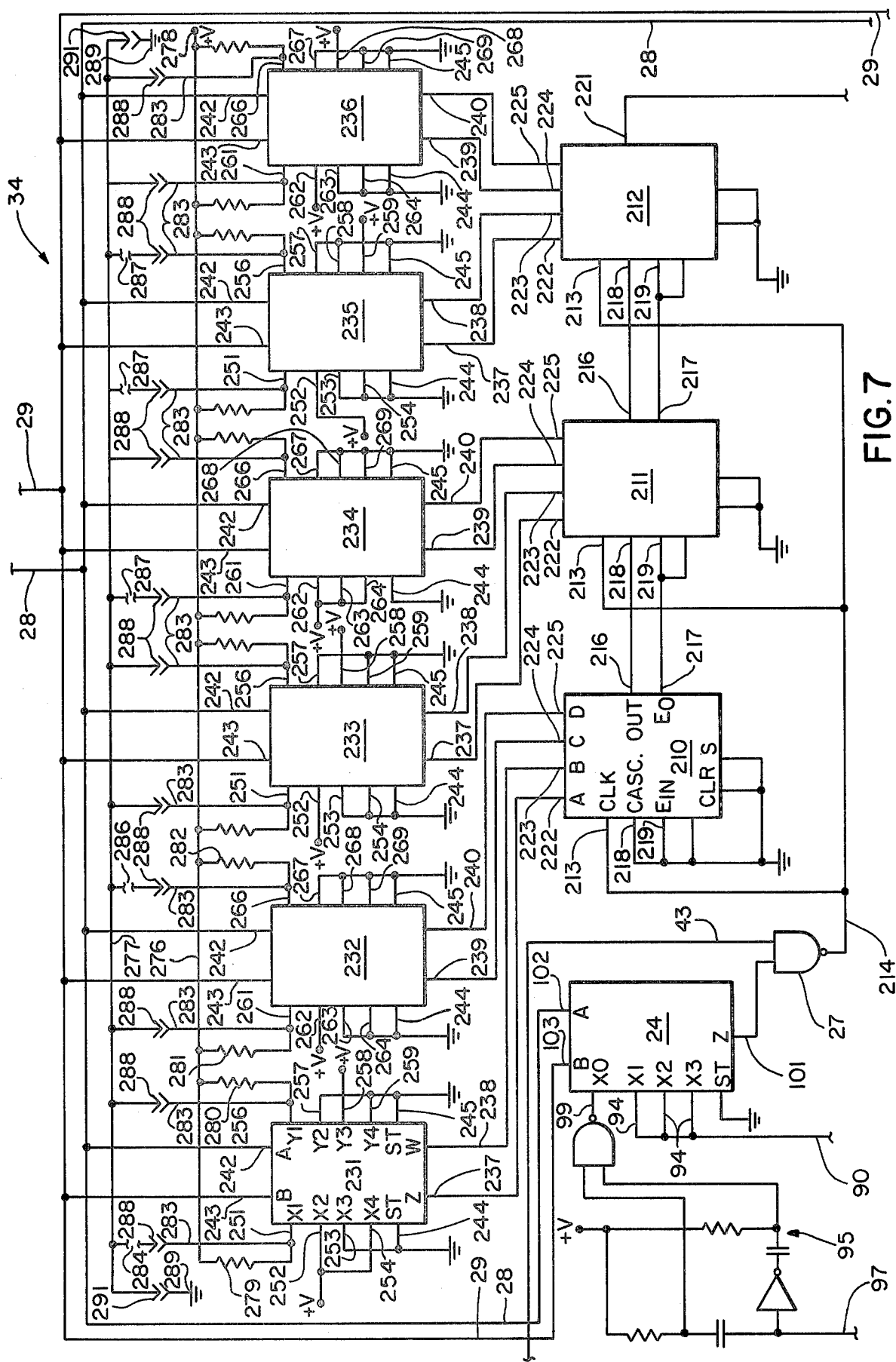
Figure 8:
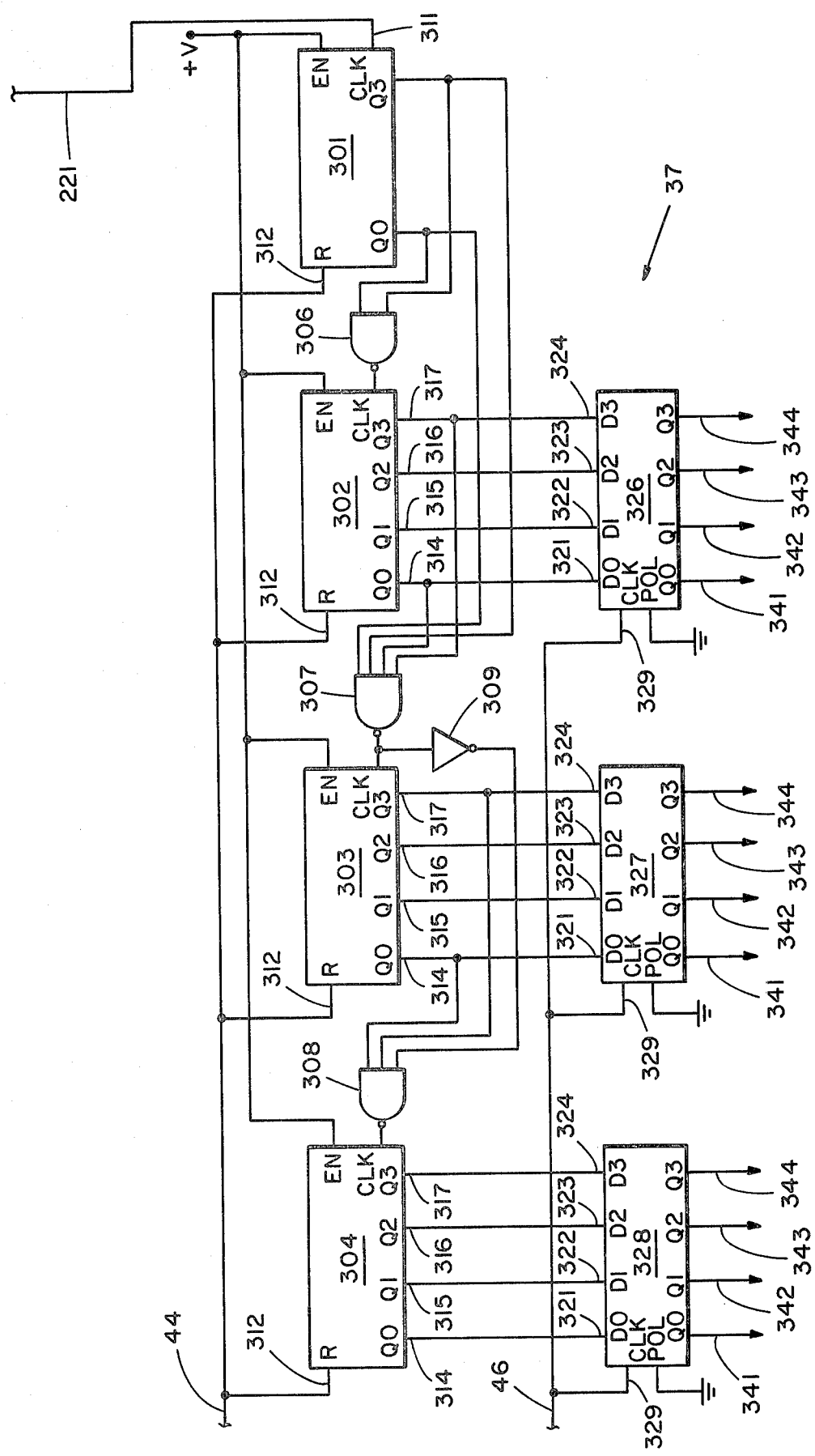

The information, either a high or a low value, for the four information inputs 251, 256, 261 and 266 of the six code programmers, these information inputs being associated with the first address or mode of operation, are provided by two lines 276 and 277. The line 276 is connected to a positive potential terminal 278, and resistors 279, 280, 281 and 282 respectively connect the information inputs 251, 256, 261 and 266 to the line 278. Some of the information inputs 251, 256, 261 and 266 may also be connected directly to the ground line 277, and this accomplished using code devices illustrated in FIGS. 11 and 12, to be described hereinafter. Portions of the code devices are illustrated in FIG. 7 by lines 283 and plug-type connectors 288. One side of each of the connectors 288 is connected to the ground line 277 which in turn is connected to the ground terminal 289 by still another connector 291.

To obtain the program or code 943 described herein, it will be noted that the conductor 283 associated with the information input 251 of the programmer 231 is broken or severed as indicated at 284, and that the conductor 283 associated with the input 266 of the programmer 232 is also broken as indicated at 286. Consequently, the inputs 251 and 266 will be at the level of the positive potential terminal 278, but the information inputs 256 and 261 will have a logic 0 or low values thereon because the associated lines 283 are connected directly to the ground line 277 through the connectors 288. It will be apparent therefore that the inputs 251 and 266 of the programmers 231 and 232 will be high whereas the two inputs 256 and 261 will both be low. When the first described address appears on the lines 28 and 29, the information on the inputs 251, 256, 261 and 266 will be transferred to the lines 237, 238, 239 and 240, respectively, and consequently the inputs 222 through 225 of the multiplier 210 will be high, low, low and high, respectively. The input 222 is for the number 1, the input 223 is for the number 2, the input 224 is for the number 4, and the input 225 is for number 8. Consequently, the instructions fed into the multiplier 210 will be 1008 in BCD form which is the number 9 in decimal form.

With regard to the two programmers 233 and 234, it will be noted that the information input 261 of the programmer 234 has its connection to the ground line 277 broken as indicated at 287 whereas the other three information inputs 251, 256 and 266 will all be connected to the negative line 276. From an analysis similar to that for the two programmers 231 and 232, it will be apparent that, in the presence of the first address, low signals will appear at the outputs 237, 238, and 240 but a high signal will appear at the output 239. This results in the number 4 being coded into the multiplier 211.

Regarding the two programmers 235 and 236, the two inputs 251 and 256 of the programmer 235 both have their connections to the ground line 277 broken as indicated at 287 whereas the two information inputs 261 and 266 of the programmer 236 are both connected to the ground line 277. Consequently, the signals appearing on the outputs 237 and 238 will both be high whereas the information on the two outputs 239 and 240 will both be low. This results in the decimal number 3 being coded into the multiplier 212. Consequently, the three multipliers will function so that 943 pulses will be produced on the output line 221 for every 1,000 pulses received on the line 214.

A similar analysis is applicable when one of the other three addresses appears on the lines 28 and 29. As illustrated in FIG. 3, the six code programmers cause the numbers 555 in BCD form to be fed into the three multipliers 210 through 212 during the second address, the numbers 268 in BCD form to be fed into the three multipliers during the third address, and the numbers 142 in BCD form to be fed into the three multipliers during the fourth address.

In the specific example being described and illustrated herein, the twelve information inputs 252, 253, 254, 257, 258, 259, 262, 263, 264, 267, 268 and 269 of the six code programmers 231 to 236 are all hard wired and are connected either to a ground terminal or to a positive potential terminal. The connections illustrated in FIG. 7 produce the codes or programs shown in FIG. 3 for the other three addresses.

The output line 221 leading from the programmable ratio selector and multiplier 34 is fed to the counter and storage component 37 (FIGS. 1 and 8) which includes a decade counter which is formed by four interconnected binary counter stages 301, 302, 303 and 304, three NAND gates 306, 307 and 308, and an inverter 309. The output of the counter 302 represents units, the output of the counter 303 represents tens, and the output of the counter 304 represents hundreds, these outputs being in BCD form. The first counter 301 is a dummy stage which always has a zero or blank output. The incoming pulses on the line 221 are received on the clock input 311 of the counter 301, and the reset input 312 of each of the four counter stages is connected to the reset line 44. The remainder of the connections between the counter stages 301 to 304, the gates 306 to 308 and the inverter 309 are conventional and form a four-stage decade counter as previously mentioned. Each of the three stages 302, 303 and 304 has four output connections 314, 315, 316 and 317, and the count in each stage appears at the output connections 314 through 317 in BCD form.

As a specific example, assume that the system has been set in the first address described previously wherein the ground speed of the tractor is to be measured. Further, assume that 1,000 pulses appear on the line 214, these pulses having been generated by the sensor 21 and doubled by the frequency doubler 95. For the 1,000 pulses appearing on the line 214, a total of 943 pulses appear on the line 221. Prior to the appearance of the pulses on the line 214, the stages 301 through 304 are all reset by a reset pulse 58 on the line 44 near the end of the prior cycle. In these circumstances, the number 9 in BCD form appears at the four outputs 314 through 317 of the counter stage 304, the number 4 in BCD form appears at the output of the stage 303, and the number 3 in BCD form appears at the output of the stage 302.

The output connections 314 through 317 of the three counter stages 302, 303 and 304 are respectively connected to input connections 321, 322, 323 and 324 of three storage or latch components 326, 327 and 328 which are designed to store, in BCD form, the count in the three counter stages 302, 303 and 304. Each of the three latch or storage components 326, 327 and 328 also has a clock input 329 which is connected to the line 46 which receives the strobe pulses 57. When each strobe pulse 57 appears on the line 46, the three storage components 326, 327 and 328 sense the count appearing on the outputs 314 to 317 of the three counter stages 302 to 304 and store this count until the next strobe pulse. Upon the appearance of the next strobe pulse, the information previously stored is automatically cleared and the next subsequent count in the counter stages is transferred to the storage components 326 through 328. Consequently, each strobe pulse 57 causes the three storage components to have the information stored therein updated to the most recent count in the counter stages 302 through 304, and the storage components 326 through 328 hold the stored information until the next strobe pulse.

Figure 9:
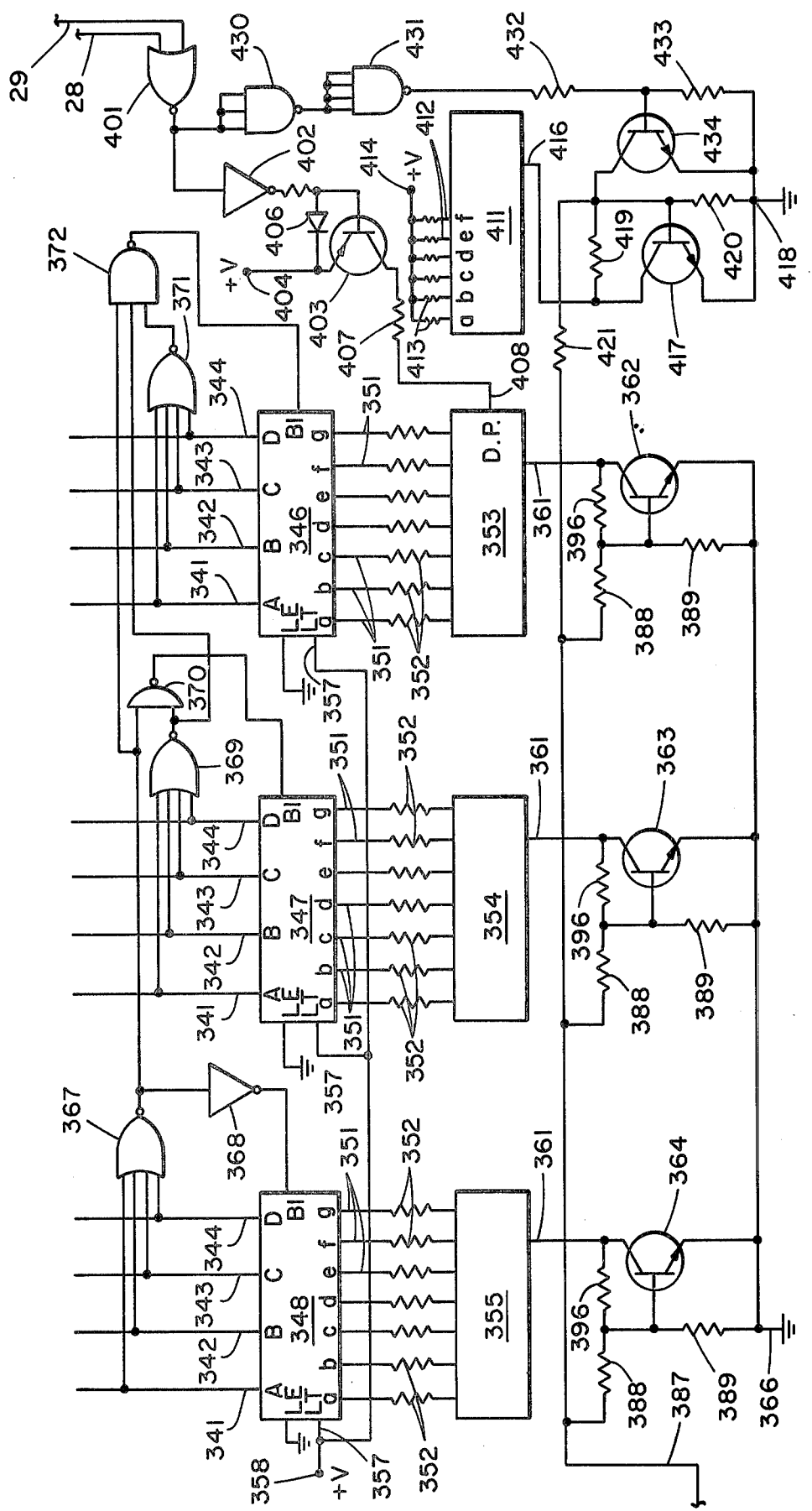

In the specific example of the invention disclosed herein, the information contained in the storage or latch components 326 through 328 is continuously displayed by a light emitting diodes (LED) type of display in the indicator 41 (FIGS. 1 and 9). Each of the three latch components 326 through 328 has four output connections 341 through 344 which are connected to four inputs of three BCD-to-7-segment decoders 346, 347 and 348 (FIG. 9). Each of the three decoders 346 through 348 has seven output connections 351 which are respectively connected through resistors 352 to seven LED's contained in each of three components 353, 354 and 355. Each of the three decoders 346 through 348 further includes an input 357 which is permanently connected to a positive potential terminal 358. Depending upon the BCD number fed into each of the three decoders 346 through 348 on the input lines 341 through 344, the positive potential terminal 358 will be switched or routed in the decoders 346 through 348 to selected resistors 352 and consequently to selected LED's in the components 353 to 355. As is well known in the art, any number from 0 through 9 may be displayed by simultaneously energizing two or more LED's in each component 353 to 355.

The LED components 353 through 355 also have inputs 361 which are connected to the collectors of three NPN transistors 362, 363 and 364, respectively. The emitters of the three transistors 362 through 364 are connected to a ground terminal 366. The input 361 of each of the three LED components 353 through 355 is connected to the cathodes of all of the seven diodes contained in the component. The anodes of the diodes are respectively connected to the seven resistors 352. In each of the decoders 346 to 348, seven solid state switches are provided, one between one of the resistors 352 and the positive potential input 357. The BCD signals on the inputs 341 to 344 are effective to close some of the switches in the components 346 to 348 and thereby apply the positive potential to some of the resistors 352.

For example, assume that the BCD signals on the lines 341 through 344 leading to the decoder 348 represent the number 8. To energize the LED's for this number, all seven of the LED's must be energized. The decoder 348 therefore operates to connect the input 357 to all of the resistors 352 and to the anodes of all seven LEDs contained in the component 355. Assuming that the transistor 364 is biased to saturation, a circuit path will therefore be completed from the positive potential input 357, through the decoder 348, through all seven resistors 352, through all of the LED's in the component 355, through the transistor 364 and to the ground terminal 366.

If a number other than 8 is to be displayed, the input signals on the lines 341 through 344 will result in the decoder 348 closing the connections between the positive potential input 357 are selected outputs 351 in order to energize the appropriate LED's in the component 355.

The indicator circuit 41 further includes a plurality of gates 367 through 372 are interconnected between the conductors 341 through 344 and the decoders 346 through 348 and serve to suppress any leading zeros. Since zero suppression circuits of this nature are conventional, the operation will not be described in any detail.

It was previously mentioned that the transistors 362, 363 and 364 are biased on when the LED's in the components 353 through 355 are energized. The transistors 362 through 364 are biased by a power supply 371 (FIG. 10) which also provides a regulated DC supply voltage that is connected to all of the positive potential terminals disclosed herein. The power supply 371 includes a ground terminal 372 and a positive terminal 373 which, in the instance where the system is used in a tractor, are connected across the tractor 12 volt battery terminals. The components contained in the dashed line box indicated by the numeral 374 form a conventional regulated DC voltage supply which provides a voltage of approximately positive 7.5 volts DC on an output line 376 which, as previously mentioned, is connected to all of the positive potential terminals referred to and illustrated herein. The ground terminal 372 is connected to all of the ground terminals described herein.

The bias circuit for the three transistors 362 through 364 includes a PNP transistor 381 which has its emitter connected to the positive terminal 376 and its collector connected through a resistor 382 to the ground terminal 372. The base of the transistor 381 is connected to the juncture of two resistors 383 and 384 which are connected between the positive terminal 376 and the ground line 372. A diode 386 also connects the base to the positive terminal 376. The two resistors 383 and 384 form a voltage divider network which normally biases the transistor 381 to conduction. For example, if the resistor 383 has a value of 2700 ohms and the resistor 384 has a value of 10,000 ohms, the voltage on the base of the transistor 381 will be approximately 5.5 volts, and since the emitter of this transistor is at approximately 7.5 volts, the transistor 381 will be biased on. Connected to the collector of the transistor 381 is a line 387 which is connected through resistors 388 (FIG. 9) directly to the base of each of the three transistors 362 through 364. Other resistors 389 connect the bases of the three transistors 362 to 364 to the ground terminal 366. When the transistor 381 is biased on, the line 387 will be connected to the positive potential terminal 376. The two resistors 388 and 389 associated with each of the three transistors 362 through 364 form a voltage divider network and are sized to bias the transistors 362 to 364 to saturation.

It will be apparent from the circuitry described thus far that when the tractor ignition is turned on, the battery potential appears across the terminals 372 and 373, the regulated voltage of approximately 7.5 volts appears at the terminal 376, the transistor 381 is biased on and the three transistors 362 through 364 are all biased to saturation. Consequently, depending upon the information coded into each of the three decoders 346 through 348, some of the LED's contained in the three components 353 through 355 will be energized and will display the count stored in the three latches 326 through 328.

Where the system is installed in a tractor which is frequently operated at night, if the LED's in the components 353 through 355 were fully energized at night, they would emit an excessive amount of light which might be distracting to the operator of the tractor. It is, consequently, highly desirable that the LED's be dimmed somewhat during night operation of the tractor. This function is accomplished in a novel manner by making the energization of the LED's responsive to energization of the headlights of the tractor.

Figure 10:
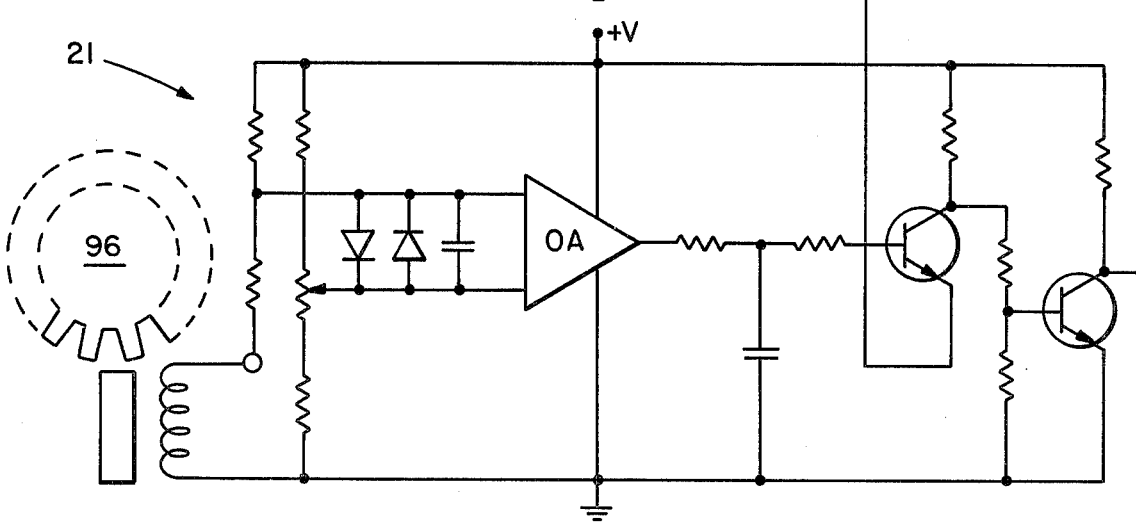
Figure 10:
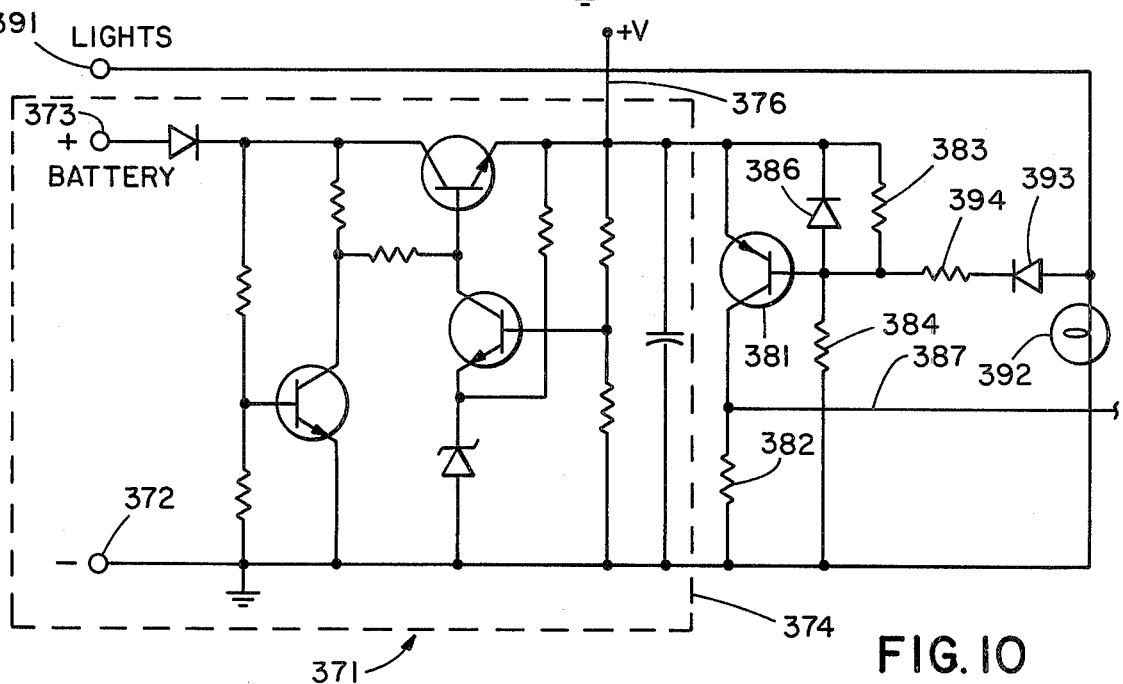

With reference once again to the power supply 371 in FIG. 10, a terminal 391 is connected to the tractor circuit which energizes the tractor headlights. When the headlights are turned on, the full battery potential of approximately 12 volts appears at the terminal 391. A lamp 392 is connected between the terminal 391 and the ground terminal 372, and the lamp 392 is preferably located in the display panel or dash of the system and provides light so that the operator of the tractor can read the name plates and other unilluminated indicia on the panel. The terminal 391 is also connected through a diode 393 and a resistor 394 to the base of the transistor 381. The potential at the terminal 391 is higher than the 7.5 volt potential on the positive terminal 376, and consequently the transistor 381 will be turned off when the headlights of the tractor are turned on. When the transistor 381 is biased off, the line 387 is essentially at ground potential. The three transistors 362 through 364 (FIG. 9) are nevertheless still biased on to some extent by another bias circuit including, for each of the three transistors, the resistor 389 and another resistor 396 which is connected between the base and the collector of each transistor. The circuits extending from the ground terminal 366, the resistors 389 and 396, the output connections 361, the LED's and the resistors 352, the decoders 346 to 348 and to the positive potential terminal 358 results in a voltage on the bases of the transistors 362 to 364 which biases the transistors 362 through 364 at less than saturation. Consequently, the LED's in the components 353 through 355 will be energized at less than their maximum potential.

The system further includes means for forming four digit numbers when the system is operating in a mode other than the ground speed mode, and for forming a decimal point only when the system is operating in the ground speed mode. This portion of the system includes a NOR gate 401 (FIG. 9) which has two inputs connected to the lines 28 and 29. It will be recalled that the address for the ground speed mode of operation consists of a low value on both of the lines 28 and 29. For any of the other three addresses, there is a high value on at least one of the two lines 28 and 29. Consequently, the output of the NOR gate 401 will be high during the ground speed mode of operation but will be low during any of the other three modes of operation.

The output of the NOR gate 401 is connected through an inverter 402 to the base of a PNP transistor 403. The emitter of the transistor 403 is connected to a positive potential terminal 404 and is connected through a diode 406 to the base. The collector of the transistor 403 is connected through a resistor 407 to a decimal point input 408 of the LED component 353.

When the output of the NOR gate 401 is high, which occurs only during the ground speed mode of operation, the output of the inverter 402 will be low and the transistor 403 will be biased on. The input 408 will therefore be connected to the positive potential terminal 404 and this high signal causes a decimal point in the LED component 353 to be illuminated. This decimal point appears between the numerals displayed by the two components 353 and 354. A typical farm tractor, for example, has a maximum speed in the area of 30 mph. The LED component 355 will therefore display the tens digit, the component 354 will display the ones digit, and the component 353 will display the tenths digit, the decimal point appearing of course between the tenths and the one digits.

When the system is operating in one of the other three modes of operation, one of the inputs of the NOR gate 401, or both, will be high and its output will be low. The output of the inverter 402 will therefore be high, the transistor 403 will be biased off, and the positive signal will not appear at the input 408 of the component 355. The decimal point will therefore be suppressed during the other three modes of operation.

It is also preferable that a 0 be added to the right of the number displayed by the component 355 whenever the system is operating in a mode other than the ground speed mode of operation, so that the component 355 will indicate thousands, the component 354 will indicate hundreds, the component 353 will indicate tens and the fourth digit will always be 0. The fourth digit is provided by a LED component 411 which has six inputs 412 connected to the LED's which are energized when the component 411 forms the number 0. Six resistors 413 are connected between the LED's and a positive potential terminal 414. Another input 416 of the component 411 is connected to the collector of an NPN transistor 417 which has its emitter connected to a ground terminal 418. The base of the transistor 417 is connected to the juncture of two resistors 419 and 420 which are connected between the input 416 and the ground terminal 418. The base of the transistor 417 is also connected by still another resistor 421 to the line 387 which leads to the power supply 371.

It will be apparent that the resistors 420 and 421 form a voltage divider network which places a positive potential on the base of the transistor 417. With such a positive potential, the transistor 417 is biased on and the input 416 of the component 411 is connected directly to ground terminal 418. A current path will therefore be formed from the positive terminal 414, through all six resistors 413, through all six of the diodes in the component 411 and through the transistor 417 to ground 418, and the six energized LEDs will display the number 0. When the headlights of the tractor are turned on, the line 387 falls to approximately ground potential as previously explained, but the transistor 417 remains biased on but to a lesser extent due to the voltage divider formed by the resistors 419 and 420. This operation is of course similar to the biasing of the three transistors 362 through 364.

As previously mentioned, it is desirable that the 0 be displayed by the component 411 only when the system is not in the ground speed indicating mode. The LEDs in the component 411 are prevented from being energized during the ground speed mode by circuit components including two NAND gates 430 and 431. The gate 430 has all of its inputs connected to the output of the NOR gate 401, and the NAND gate 431 has all of its inputs connected to the output of the NAND gate 430. During the ground speed mode of operation, the output of the NOR gate 401 is high, as previously mentioned, and consequently the output of the NAND gate 430 will be low and the output of the NAND gate 431 will be high. The output of the gate 431 is connected through two resistors 432 and 433 to the ground terminal 418, and the juncture of the two resistors 432 and 433 is connected to the base of an NPN transistor 434. The emitter of the transistor 434 is connected to the ground terminal 418 and the collector of the transistor 434 is connected to the base of the transistor 417. It will be apparent from FIG. 9 that the collector and the emitter of the transistor 434 are connected directly across the biasing resistor 420 for the transistor 417. When the output of the gate 431 is high, which occurs during the ground speed mode of operation, the transistor 434 will be biased on and will serve as a short or direct connection between the base of the transistor 417 and the ground terminal 418. The transistor 417 will therefore be biased off and will prevent the diodes in the component 411 from being energized. However, during the other three modes of operation, the output of the gate 431 will be low, the transistor 434 will be biased off and the transistor 417 and the component 411 will operate as previously explained. Consequently, the component 411 will display a 0 during three modes of operation but not during the ground speed mode of operation. However, the decimal point previously described will be present during the ground speed mode of operation.

To summarize the operation of the system, assume that the ignition of the tractor has been turned on. The battery potential appears across the terminals 372 and 373 of the power supply 371 but, assuming daylight operation, a potential will not appear at the terminal 391. When the engine of the tractor has started, the toothed member 373 will rotate at a speed which is a direct ratio of the engine speed, but the toothed member 96 will turn only after the vehicle has been set in motion.

Upon initial application of power to the system, the positive potential appears at the terminal 161 of the mode selector component 31, this terminal 161 being connected to the terminal 376 of the power supply 371. The transistor 158 and the associated circuit components generate a pulse which resets both of the flip-flops 151 and 152 and produces low signals on the two lines 28 and 29. This address is for the ground speed mode of operation. With this address on the lines 28 and 29, one of the four light emitting diodes 199 and 206 to 208 will be energized, and the name plate associated with the energized diode will indicate that the system is in the ground speed mode of operation. Before the tractor starts to move, the member 96 is stationary and consequently there are no pulses on the line 214. However, as soon as the tractor is set in motion, the sensor 21 generates a train of pulses. The timing generator 42 cyclically generates time base signals which open the gate 27 during the first half of each cycle. The frequency of the pulses on the line 214 is multiplied by a ratio that preset into the BCD code programmers 231 to 236, the multiplication being accomplished by the three BCD rate multipliers 210 through 212. The multiplied frequency signal is fed to the counter stages 301 through 304. After the counting portion 54 of the cycle, a strobe pulse 57 appears on the line 46 which transfers the count from the counter stages to the latches 326 through 328. The count information is stored in the components 326 through 328 in BCD form, and the decoders 346 through 348 decode this information and energize the three LED components 353 through 355 to display the appropriate numbers. During the ground speed mode of operation, the fourth LED component 411 is not energized, but a decimal point is provided. During each cycle of operation of the system, each cycle being the time of one time base signal including both parts 54 and 56, a count of the frequency is made, the count is stored in the components 326 through 328, and the stored count is displayed. If the time of a total cycle is approximately one second, it will be apparent that a reading or measurement of ground speed will be taken once every second and that the display will be updated every second.

If the system is being operated at night, a potential appears at the terminal 391 of the power supply 371 when the tractor headlights are turned on, and this results in the LED components 353 through 355 and 411 being illuminated at less than maximum full power.

To place the system in operation for one of the other three modes of operation described herein, the tractor operator presses the shutter button 170 of the sealed switch 32. If the operator presses the shutter mechanism 177 once, the second address is generated on the lines 28 and 29 and the system will display engine speed. In this mode of operation, the signal from the sensor 22 appears on the line 214 and the frequency is multiplied by the ratio which is coded or preset into the multipliers 210 and 211 by the code programmers 231 through 236 for the second mode of operation. The display or indicator 41 will display the engine speed, the decimal point which was present during the first mode of operation being suppressed and the LED component 411 being energized to display a 0. If the operator presses the shutter button 170 in the switch 52 once again, the third address will be generated on the lines 28 and 29. The system will operate similarly to that for the second address except that a different multiplier or ratio will be coded into the multipliers 210 and 212. Similarly, if the operator presses the shutter button 170 a third time, the fourth address will be generated on the lines 28 and 29 and, once again, another ratio will be coded or programmed into the three multipliers 210 through 212.

To make the system disclosed herein adaptable for use with a variety of tractor designs, each design having different wheel diameters, it is preferable that externally adjustable means be provided for presetting the BCD code programmers 231 to 236 so that the multiplication factor is appropriate to a given wheel diameter. As previously mentioned, the toothed wheel 96 of the sensor 21 turns at a rate which is a function of axle speed, and the ground speed of the vehicle will be a function both of the axle speed and the wheel diameter. For a wheel diameter of 63.2 inches, the appropriate ratio factor is 943 which is the ratio described in the present specific example. On the other hand, if the wheel diameter were 56.2 inches, the correct multiplication factor would be 839; for a wheel diameter of 59.6 inches, the multiplication factor would be 890; and for a wheel diameter of 65.2 inches, the multiplication factor would be 973. The foregoing specific examples indicate that for larger diameter wheels, the multiplication factor is higher because the tractor will travel a greater distance for each revolution of the axle. Other multiplication factors may of course be calculated for other wheel sizes.

Figure 11:
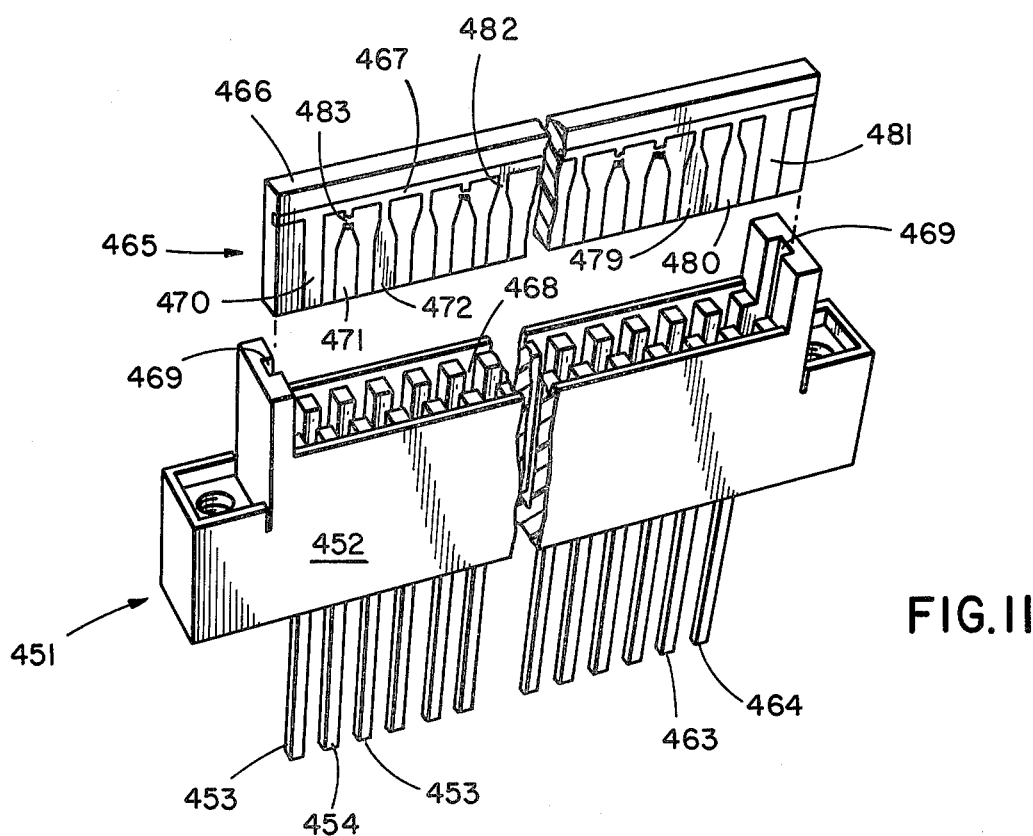
FIG. 11 illustrates a coding device used in the system.
Figure 12:
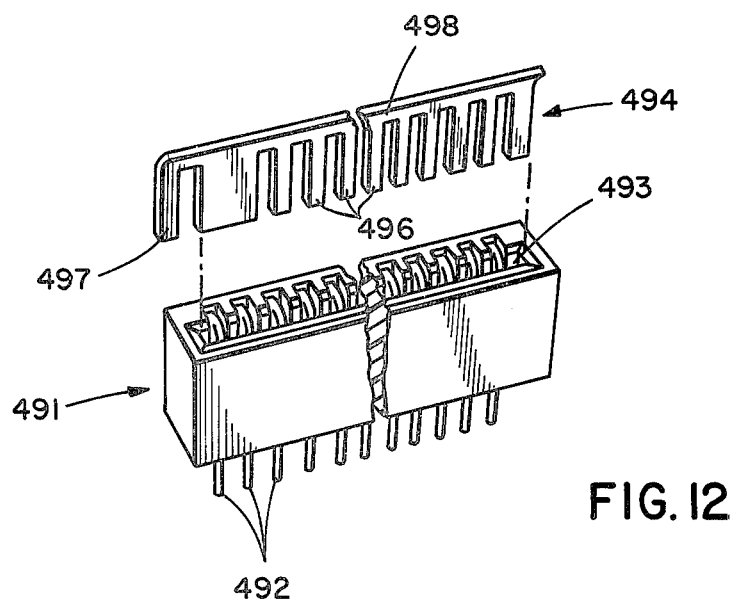
FIG. 12 illustrates an alternative form of coding device.

FIGS. 11 and 12 illustrate two forms of code devices which may be used to preset the code programmers 231 through 236. The code device illustrated in FIG. 11 includes a socket part 451 including a body 452 made of an insulating material. A plurality of conducting pins are mounted on the body 452, 12 pins 453 through 464 being shown but a total of 14 pins being required for the circuit shown in FIG. 7. The two endmost pins 453 and 464 are electrically connected to the ground terminal 289 in the circuit 34 (FIG. 7), and the remaining 12 pins are electrically connected to the input terminals 251, 256, 261 and 266 of the six code programmers 231 through 236.

The code device 451 further includes a comb or plug part 465 including an insulating circuit board 466 and conductors formed thereon. The conductors include a bar 467 which extends the length of the board 466 and a plurality of comb teeth 470 to 481 which extend from the bar 467 to the lower edge of the board 466.

The body 452 has an elongated slot 468 formed therein which receives the plug part 465. Grooves 469 are formed in the body 452 act as guides and supports for the plug part 465. The upper ends of the pins 453 to 464 appear on the inside of the slot 468 and are spaced so that they are engaged by the lower ends of the teeth 470 to 481 when the plug part 465 is pressed tightly into the slot 468. In the present illustration, there are 12 pins 453 to 464 and there is one tooth 470 to 481 electrically connected to each pin.

The two endmost teeth 470 and 481 make electrical engagement with the pins 453 and 464, respectively, when the plug part 465 is inserted into the elongated slot 468. Therefore, the teeth 470 and 481 and the bar 467 will be connected to the ground terminal 489 by the pins 453 and 464, and any of the teeth 471 through 480 which are electrically connected to the bar 467 will also be connected to the ground terminal 489. To disconnect one of the pins 454 through 463 from the ground terminal, the associated tooth of the plug part may be severed, and for this purpose each tooth 471 through 480 includes a reduced width portion or neck 482. If the tooth 471 and the pin 454 are associated with the input 251 of the programming component 231, the neck 452 of the tooth 471 may be severed as indicated by the numeral 483, which prevents the input 251 of the component 231 from being connected to the ground terminal 289. This input 251 will therefore be the level of the positive potential terminal 278 as previously explained. The tooth 472 which is connected to the input 256 of the component 231 is left intact and therefore the input 251 is connected directly to the bar 467, the teeth 470 and 481, the pins 453 and 464, and to the ground terminal 289.

It will be apparent that by selectively breaking and leaving intact various necks 482 of the teeth 471 through 480, any desired code may be preset into the programmers 231 through 236 for the ground speed mode of operation. Further, the system may be coded differently at any time because the plug part 465 is removable from the socket part 451 and another plug part having a different code formed thereon may be inserted.

FIG. 12 illustrates another code device which operates similarly to that illustrated in FIG. 11. The code device illustrated in FIG. 12 also includes a socket part 491 having a plurality of conductive pins 492 mounted thereon. The pins 492 are electrically connectable to input code programmers similar to the programmers 231 through 236. The socket part 491 also includes a slot 493 which receives an electrically conductive comb or plug part 494. The comb or plug part 494 includes a plurality of teeth 496 which electrically engage the pins 492 when the comb part 494 is inserted into the slot 493. At the leftmost end of the comb part 494 is an aligning or orienting prong 497 which is provided to ensure that the comb part 494 is inserted into the slot 493 in one direction or orientation only. Once again, one of the pins 492 is electrically connected to a ground terminal, and the upper side 498 of the comb part 494 forms a conducting bar similar to the bar 467. A code may be preset into or formed by the comb part 494 by breaking or snipping off selected teeth 496 so that some of the pins 492 will be connected to the bar 498 and ground and some will not be.

In the system described herein, only the code for the ground speed may be changed when desired, but it should be understood that in some instances it may be desirable to have all of the inputs 251 through 254, 256 through 259, 261 through 264, and 266 through 269 of all of the six code programmers 231 through 236 externally accessible and connectable to ground using code devices similar to those shown in FIGS. 11 and 12. In such an arrangement, the multiplier factor or ratio for any of the four modes of operation could then be readily and easily changed when desired.

In a tractor installation, it is not contemplated that the coding devices would be changed frequently. An appropriate coding comb for a particular tractor wheel design would be inserted into the system by the manufacturer of the system or by the manufacturer of the tractor, and this coding comb would normally be left in place during the life of the system unless of course, wheels having different diameters are installed on the tractor.

When the term speed is used herein it is intended to include the tractor ground speed in mph, which of course is related to axle revolutions, and the rate of rotation, in rpm, of a member such as an engine or a power takeoff. While the indicator disclosed herein provides a lighted visual display, it could instead, or in addition, provide a printed read-out. The term indicator is intended to include any type of read-out. Of course, the system could display the information in other systems of units simply by changing the multiplication factors.

We claim:

1. A system for measuring and indicating the speeds of a plurality of moving members, comprising sensor means for each member adapted to respond to the speed of said member for generating an output having a characteristic that is a function of said speed of said member, multiplier means operable in a plurality of different modes, each of said modes being associated with the speed of one of said members, adjustable mode selector means for routing the output of one of said sensor means to said multiplier means, and said multiplier means being operable to multiply said characteristic by a different preselected ratio in each of said modes, indicator means connected to said multiplier and indicating said multiplied characteristic, said adjustable mode selector means being further connected to set said multiplier for operation in one of said modes, and said multiplier means including manually adjustable ratio selector means for coding said multiplier means to multiply said characteristic by a preselected ratio.

2. A system as in claim 1, wherein said ratio selector means comprises code programming means for preselecting said ratio, and adjustable code means having said ratio coded thereon.

3. A system for measuring and indicating the speed of a moving member, comprising sensor means adapted to respond to the speed of said member for generating an output having a characteristic that is a function of said speed, multiplier means connected to receive said output and multiply said characteristic by a preselected ratio, indicator means responsive to said characteristic for indicating said speed, and said multiplier means including adjustable ratio selector means for coding said multiplier means to multiply said characteristic by a preselected ratio, said ratio selector means comprising code programming means for preselecting said ratio, and adjustable code means having said ratio coded thereon, said code programming means comprising at least one component having a plurality of inputs, and said adjustable code means comprising a first part having a plurality of first conductors, one of said first conductors being connected to each of said inputs, and a second part which is removably attached to said first part and includes a conductor bar adapted to be connected to a signal source, said second part further including second conductor means connectable between said bar and selected first conductors, said selected first conductors thereby being connected to said signal source and non-selected first conductors being unconnected to said signal source.

4. A system as in claim 3, wherein said code programming means further includes means for connecting said non-selected first conductors to another signal source.

5. A system according to claim 1, said mode selector means including a manually operable switch, and a hermetically sealed casing around said switch.

6. A system as in claim 5, wherein said manually operable switch includes light emitting means, light responsive means, and manually operable shutter means between said light emitting means and said light responsive means.

7. A system as in claim 6, wherein said light responsive means is connected in a circuit for generating a signal upon actuation of said shutter means.

8. A system according to claim 1, said mode selector means including circuit means for automatically setting said system in a selected mode upon initial energization of said system.

9. A system as in claim 8, wherein said mode selector means comprises at least one binary component which is switchable between first and second states, said system being set for operation in one of said modes by said component when in said first state and being set for operation in another mode when in said second state, said circuit means being connected to said binary component and switching said component to said first state upon initial energization of said system.

10. A system as in claim 9, wherein said mode selector means further includes manually operable switch means connected to said component for actuating said component between said first and second states.

11. A system as in claim 9, wherein said mode selector means comprises two of said binary components connected as a two stage counter, said two binary components being switchable to four different states and operable to set said system for operation in four different modes.

12. A system according to claim 1 wherein said system is for use in a vehicle having lights which are turned on during night operation, said indicator means visually displaying a speed at a preselected level of visibility, and means responsive to energization of said lights for reducing the level of visibility of said display.

13. A speed measuring and indicating system for use with a plurality of members which move at different speeds, comprising speed sensing means associated with each of said members and producing speed representative outputs, multiplier means operable in a plurality of different preselectable ratio modes for multiplying a selected output by a different preselected ratio, code means connected to said multiplier means for setting at least one of said ratios, indicator means responsive to said multiplier means for indicating a multiplied output, said ratio being selected for each output to convert the outputs to forms which may be indicated in desired systems of units, and mode selector means for routing a selected one of said outputs to said multiplier means and for setting said multiplier means for operation in one of said ratio modes and thereby multiplying by a preselected ratio.

14. A speed measuring and indicating system for use with a vehicle including an engine and wheels, comprising first speed sensing means providing a wheel speed output representative of the rate of rotation of said wheels, second speed sensing means providing an engine speed output representative of the rate of rotation of said engine, multiplier means for multiplying said outputs by preselected ratios, mode selector means for routing one of said outputs at a time to said multiplier means, each of said outputs having a ratio associated therewith in said multiplier means and said selector means further setting up said multiplier means for the appropriate ratio for each output, said multiplier means including code means for presetting said ratio associated with said wheel speed, and indicator means connected to said multiplier means for indicating said multiplied outputs.

15. A system as in claim 14, wherein said vehicle further has a power member that rotates at a constant ratio of said engine, said multiplier means having two ratios associated with engine speed output, and said mode selector means setting up said multiplier means for one or the other of said engine speed associated outputs when said engine speed output is routed to said multiplier means.

16. A speed measuring and indicating system for use with a vehicle including an engine and wheels, comprising first speed sensing means providing a wheel speed output representative of the rate of rotation of said wheels, second speed sensing means providing an engine speed output representative of the rate of rotation of said engine, multiplier means for multiplying said outputs by preselected ratios, mode selector means for routing one of said outputs at a time to said multiplier means, each of said outputs having a ratio associated therewith in said multiplier means and said selector means further setting up said multiplier means for the appropriate ratio for each outputs and indicator means connected to said multiplier means for indicating said multiplied outputs, said vehicle having lights, and said indicator means providing a visual disply and said indicator means further including means responsive to energization of said lights for modifying the form of said visual display.

17. A speed measuring and indicating system for use with a vehicle including an engine and wheels, comprising first speed sensing means providing a wheel speed output representative of the rate of rotation of said wheels, second speed sensing means providing an engine speed output representative of the rate of rotation of said engine, multiplier means for multiplying said outputs by preselected ratios, mode selector means for routing one of said outputs at a time to said multiplier means, each of said outputs having a ratio associated therewith in said multiplier means and said selector means further setting up said multiplier means for the appropriate ratio for each output, and indicator means connected to said multiplier means for indicating said multiplied outputs, said vehicle having lights, and said indicator means providing a visual display and said indicator means further including means responsive to energization of said lights for modifying the form of said visual display while said wheel speed output is routed to said multiplier means and for providing a different form of visual display when said engine speed output is routed to said multiplier means.

18. A speed responsive system, comprising speed sensor means providing a speed signal, circuit means receiving said speed signal and providing an output signal which differs from said input signal by a preselected ratio, said circuit means including code means for preselecting said ratio, said code means including a removable plug part and a socket part which receives said plug part, said plug part being in the shape of a comb and including a plurality of removable teeth members which effect electrical connections in said socket part and determine the selection of said ratio.

19. A system as in claim 18, wherein said teeth members are electrical conductors.

20. A system as in claim 19, wherein said plug part comprises an electrical bar and said teeth members are connected to said bar, some of said teeth members being selectively disconnected from said bar in order to preselect said ratio.

21. A system as in claim 18, wherein said circuit means comprises a multiplier.

* * * * *